United States Patent
Cromer et al.

(12) 
(10) Patent No.: US 6,493,104 B1
(45) Date of Patent: Dec. 10, 2002

(54) DATA PROCESSING SYSTEM AND METHOD FOR PERMITTING A COMPUTER TO AUTOMATICALLY DETECT A PRESENCE OF AND ESTABLISH A COMMUNICATIONS LINK WITH A PRINTER

(75) Inventors: Daryl Carvis Cromer, Cary, NC (US); Richard Alan Dayan, Wake Forest, NC (US); Brandon Jon Ellison, Raleigh, NC (US); Eric Richard Kern, Durham, NC (US); Howard Locker, Cary, NC (US); James Peter Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/281,562

(22) Filed: Mar. 31, 1999

(51) Int. Cl.[7] .......................... G06F 15/00; G06F 3/00; G06F 13/12; H04B 7/00
(52) U.S. Cl. .......................... 358/1.15; 710/8; 710/62; 455/507; 455/517
(58) Field of Search ........................... 358/1.15; 710/8, 710/9, 52–62; 455/507, 517

(56) References Cited

U.S. PATENT DOCUMENTS

| | | | |
|---|---|---|---|
| 5,513,302 A | 4/1996 | Tsai | 395/114 |
| 5,552,957 A | 9/1996 | Brown et al. | 361/683 |
| 5,583,912 A | * 12/1996 | Schillaci et al. | 379/21 |
| 5,647,484 A | 7/1997 | Fleming | 206/576 |
| 5,699,495 A | * 12/1997 | Snipp | 358/1.15 |
| 5,745,733 A | 4/1998 | Robinson | 395/500 |
| 5,812,531 A | * 9/1998 | Cheung et al. | 370/255 |
| 5,816,725 A | 10/1998 | Sherman et al. | 400/692 |
| 6,167,514 A | * 12/2000 | Matsui et al. | 380/255 |

OTHER PUBLICATIONS

"Built–In Printer Capability for PC Portables," IBM Technical Disclosure Bulletin, vol. 36, No. 09B, Sep. 1993, p. 281.
"Device Drivers via the Access Bus," IBM Technical Disclosure Bulletin, vol. 39, No. 01, Jan. 1996, p. 135.
Gupta, V. et al., "The Design and Deployment of a Mobility Supporting Network," IEEE, 1996, pp. 228–234.

* cited by examiner

Primary Examiner—Edward Coles
Assistant Examiner—Monica Mitchell
(74) Attorney, Agent, or Firm—Bracewell & Patterson, LLP; Carlos Munoz-Bustamante

(57) ABSTRACT

A data processing system and method are described for permitting a portable computer to automatically detect the presence of a printer within a remote area, and responsive to the detection, automatically establishing a communications link with the printer. The portable computer is physically disconnected from the printer. The portable computer transmits a wireless query signal to the remote area. In response to a printer physically located within the remote area receiving the wireless query signal, the printer transmits a wireless reply signal to the remote area. In response to the portable computer receiving the wireless reply signal, the computer automatically establishes a communications link with the printer so that the computer may utilize the printer to print information. The communications link may be established with a printer for which the computer does not include a printer driver necessary for communicating with the printer.

15 Claims, 4 Drawing Sheets

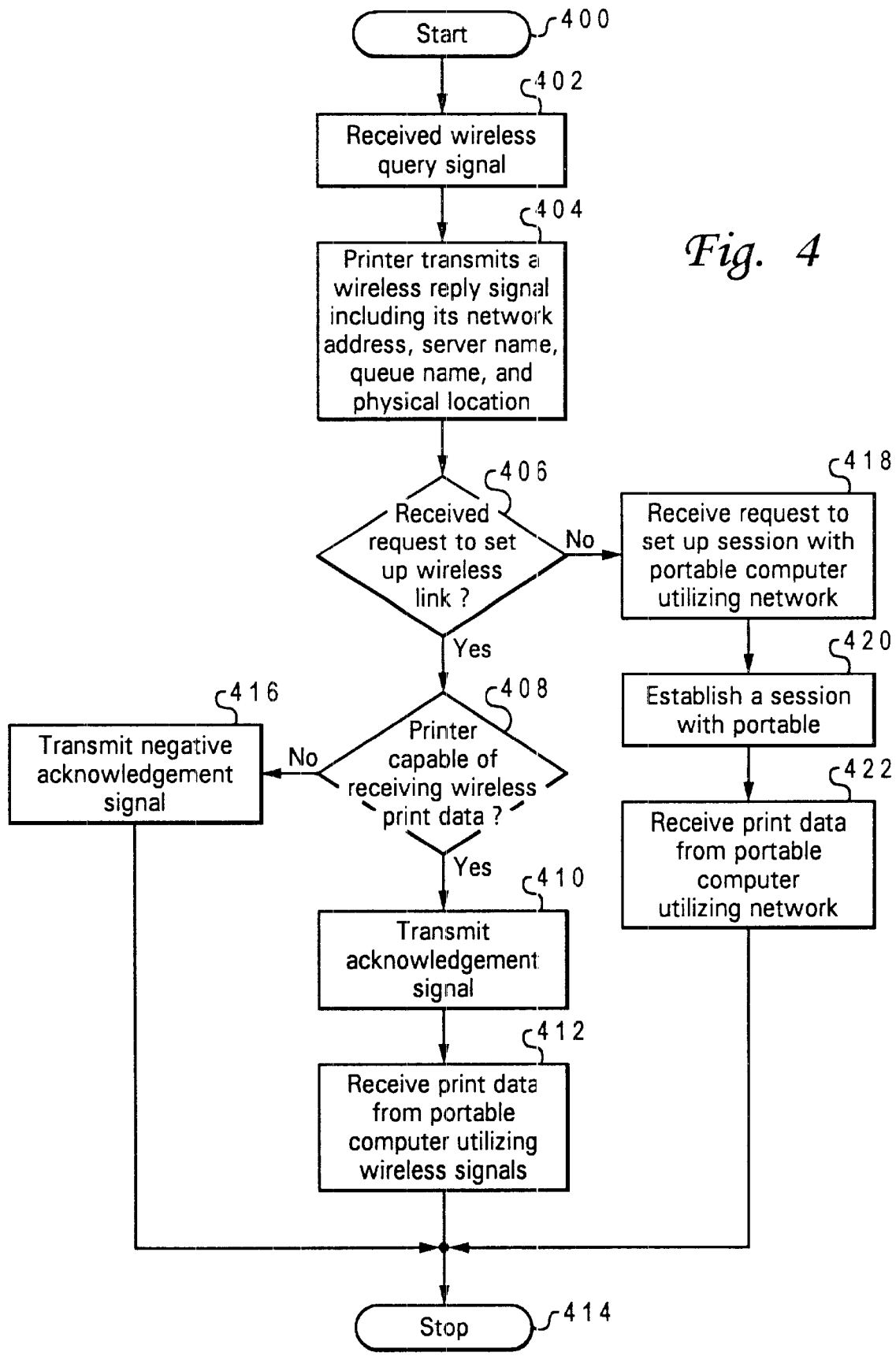

DATA PROCESSING SYSTEM AND METHOD FOR PERMITTING A COMPUTER TO AUTOMATICALLY DETECT A PRESENCE OF AND ESTABLISH A COMMUNICATIONS LINK WITH A PRINTER

BACKGROUND OF THE INVENTION

1. Field of the Invention

The present invention relates in general to data processing systems and, in particular, to a data processing system and method for permitting a computer to automatically detect and establish a communications link with a printer. Still more particularly, the present invention relates to a data processing system and method for permitting a computer to automatically detect and establish a communications link with a printer utilizing wireless signals.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC 300 series, Aptiva series, and Intellistation series.

Currently, it is difficult for a mobile computer user to locate and utilize printers at a remote site. A mobile computer user will likely be unaware of the physical locations of printers at the remote site. The mobile user must first locate a printer. One method for locating a printer is to require the computer user to physically connect the computer to the network, and utilize a listing of network printers. The user must then determine a physical location of the printer. The network address of the printer must also be added to the computer.

The user must also determine whether the computer includes the driver necessary for communicating with the printer. If the computer does not include the necessary driver, the driver must be added to the computer, or a different printer must be located.

Therefore a need exists for a data processing system and method for permitting a computer to automatically detect the presence of printers within a remote area, and thereafter, automatically establish a communications link with one of the printers in order to utilize the printer to print information such that the communications link may be established with a printer for which the computer does not include the necessary driver.

SUMMARY OF THE INVENTION

A data processing system and method are disclosed for permitting a portable computer to automatically detect the presence of a printer within a remote area, and responsive to the detection, automatically establishing a communications link with the printer. The portable computer is physically disconnected from the printer. The portable computer transmits a wireless query signal to the remote area. In response to a printer physically located within the remote area receiving the wireless query signal, the printer transmits a wireless reply signal to the remote area. In response to the portable computer receiving the wireless reply signal from the printer, the computer automatically establishes a communications link with the printer so that the computer may utilize the printer to print information. The communications link may be established with a printer for which the computer does not include a printer driver necessary for communicating with the printer. Additionally, the printer provides locating information so that the user can find the printer.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

FIG. 4 depicts a high level flow chart which illustrates a printer receiving and responding to a wireless query signal from a computer in accordance with the method and system of the present invention.

DETAILED DESCRIPTION OF A PREFERRED EMBODIMENT

A preferred embodiment of the present invention and its advantages are better understood by referring to FIGS. 1–4 of the drawings, like numerals being used for like and corresponding parts of the accompanying drawings.

The present invention is a method and system for permitting a computer to automatically detect a presence of a printer within a remote area, and thereafter, automatically establish a communications link with the printer. The communications link may be established even though the computer does not include the printer driver necessary for communicating with the particular type of printer.

The computer transmits a wireless query signal to an area which is different from the area in which the computer is typically operated. All printers physically located within the area which include a wireless transmitter/receiver device will receive the wireless query signal. The printers which received the wireless query signal will then transmit a wireless reply signal to the area. The computer will then receive the wireless reply signals transmitted by the printers. These steps occur while the computer is not physically coupled to any of the printers.

The user of the computer may then select one of the responding printers with which to establish a communications link. A communications link may be established with any of the responding printers regardless of whether or not the computer includes the necessary printer driver for the selected printer. If the computer does include the necessary printer driver, the computer is physically coupled to the wired network to which the printer is coupled. If the computer does not include the necessary printer driver, a wireless communications link is established between the computer and the printer. A generic, wireless driver is then utilized to permit the computer to communicate with the printer.

The computer will typically be a portable computer. However, those skilled in the art will recognize that the computer may be any type of portable, desktop, or other type of computer.

Figure 1:
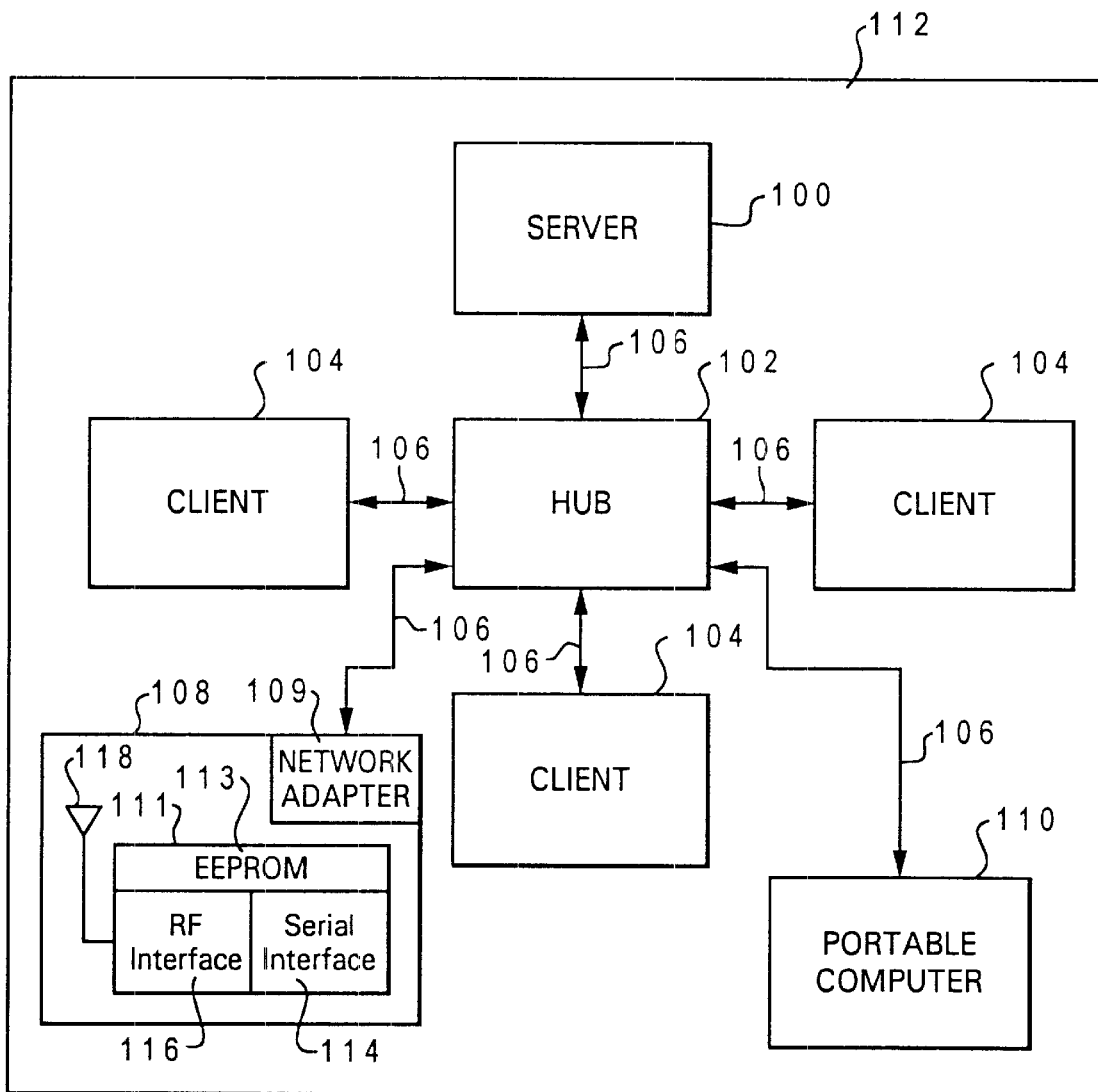
FIG. 1 illustrates a pictorial representation of a data processing system in accordance with the method and system of the present invention.

FIG. 1 illustrates a pictorial representation of a data processing system including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client systems 104 also connect to hub 102 through respective LAN busses 106. The preferred form of the network conforms to the Ethernet specification and uses such hubs.

A "network" may include any type of data communications channel, such as an Ethernet network, token ring, X.10, or X.25. Those skilled in the art will recognize that the invention described herein may be implemented utilizing any type of data communications channel. However, the preferred embodiment is implemented utilizing an Ethernet network.

A portable computer 110 and printer 108 may also be coupled to hub 102. Portable computer 110 is described in more detail in FIG. 2. Printer 108 includes a network adapter 109 to couple printer 108 to network bus 106. Printer 108 also includes a wireless device 111 which includes a storage device, such as EEPROM 113, a serial interface 114 for coupling device 111 to other components, not shown, within printer 108, a wireless interface 116 for transmitting and receiving radio frequency (RF) wireless signals, and an antenna 118 coupled to wireless interface 116.

The data processing system is located within an area 112. Area 112 is determined by the strength of a wireless signal computer 110 is capable of transmitting. When computer 110 transmits a wireless signal, it is received by printer 108 and any other printer located within area 112 which includes a wireless device.

Figure 2:
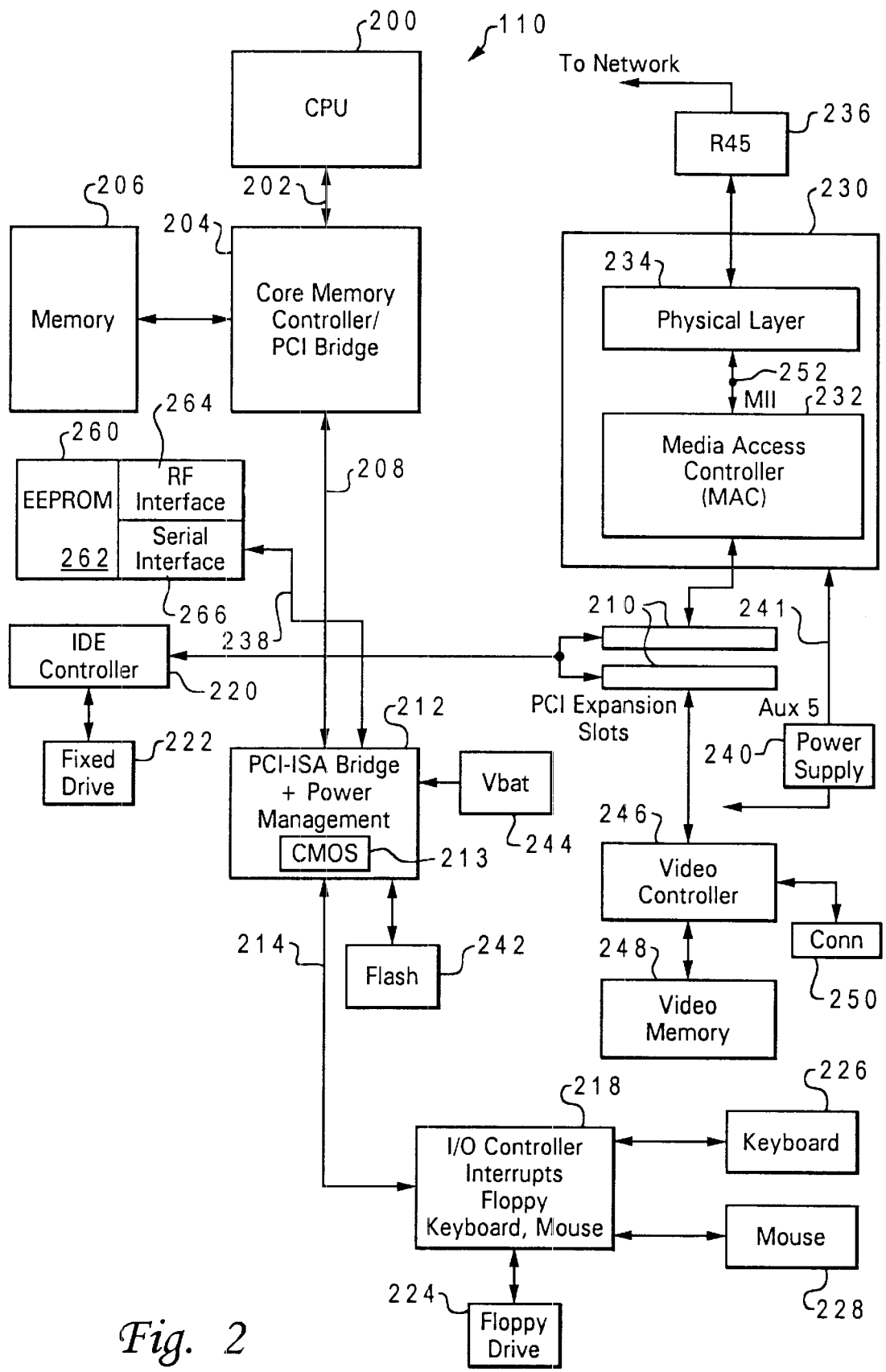
FIG. 2 depicts a more detailed pictorial representation of a portable computer included within the data processing system of FIG. 1 in accordance with the method and system of the present invention.

FIG. 2 illustrates a pictorial representation of a portable computer 110 included within the data processing system of FIG. 1 in accordance with the method and system of the present invention. Portable computer 110 includes a central processing unit (CPU) 200 connected by address, control, and data busses 202 to a memory controller and peripheral component interconnect (PCI) bus bridge 204 which is also coupled to system memory 206.

An integrated drive electronics (IDE) device controller 220 and a PCI bus to Industry Standard Architecture (ISA) bridge 212 are connected to PCI bus bridge 204 utilizing PCI bus 208. IDE controller 220 provides for the attachment of IDE compatible storage devices such as fixed disk drive 222. PCI/ISA bridge 212 provides an interface between PCI bus 208 and an optional feature or expansion bus such as the ISA bus 214. PCI/ISA bridge 212 includes power management logic. A PCI standard expansion bus with connector slots 210 is coupled to PCI bridge 204. PCI connector slots 210 may receive PCI bus compatible peripheral cards. PCI-ISA bridge controller 212 includes an interface for a flash memory 242, which includes microcode which computer 110 executes upon power-on. Flash memory 242 is an electrically erasable programmable read only memory (EEPROM) module and includes BIOS that is used to interface between the I/O devices and operating system. PCI-ISA bridge controller 212 also includes CMOS storage 213 that holds initialization settings which represent system configuration data. Storage 213 includes values which describe the present configuration of computer 110. For example, storage 213 includes information describing the list of initial program load (IPL) devices set by a user and the sequence to be used for a particular power method, the type of display, the amount of memory, time date, etc. Furthermore, this data is stored in storage 213 whenever a special configuration program, such as configuration/setup is executed. PCI-ISA bridge controller 212 is supplied power from battery 244 to prevent loss of configuration data in storage 213.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

Portable computer 110 includes a video controller 246 which may, for example, be plugged into one of connector slots 210. Video controller 246 is connected to video memory 248. The image in video memory 248 is read by controller 246 and displayed on a monitor (not shown) which is connected to computer 110 through connector 250. computer 110 also includes a network adapter 230 which may, for example, be plugged into one of the PCI connector slots 210 (as illustrated) in order to permit computer 110 to communicate with a LAN via connector 236 to hub 102.

Portable computer 110 includes a special power supply 240 which supplies full normal system power (not depicted), and has an auxiliary power main AUX 5 241 which supplies full time auxiliary power to the power management logic 212 and to network adapter 230. In response to a receipt of the wakeup signal, normal system power from power supply 240 is turned on and then powers up computer 110.

Network adapter 230 includes a physical layer 234 and a media access controller (MAC) 232 connected together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234.

MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/ reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mb/s CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network. In a preferred embodiment, physical layer 234 is implemented utilizing an Integrated Services chip ICS-1890.

Physical layer 234 includes auto-negotiation logic that serves three primary purposes. First, it determines the capabilities of computer 110. Second, it advertises its own capabilities to server computer 100. Third, it establishes a connection with server computer 100 using the highest performance connection technology.

Computer 110 includes a wireless device 260 which includes a storage device, such as EEPROM 262, a serial interface 266 coupled to a system management bus 238 for permitting device 260 to communicate with other components of computer 110, a wireless interface 264 for transmitting and receiving radio frequency (RF) wireless signals, and an antenna 120 coupled to wireless interface 264.

System management (SM) bus 238 is a two-wire, low speed, serial bus used to interconnect management and monitoring devices. Those skilled in the art will recognize that another bus within the computer may be utilized to interconnect these devices.

Figure 3:
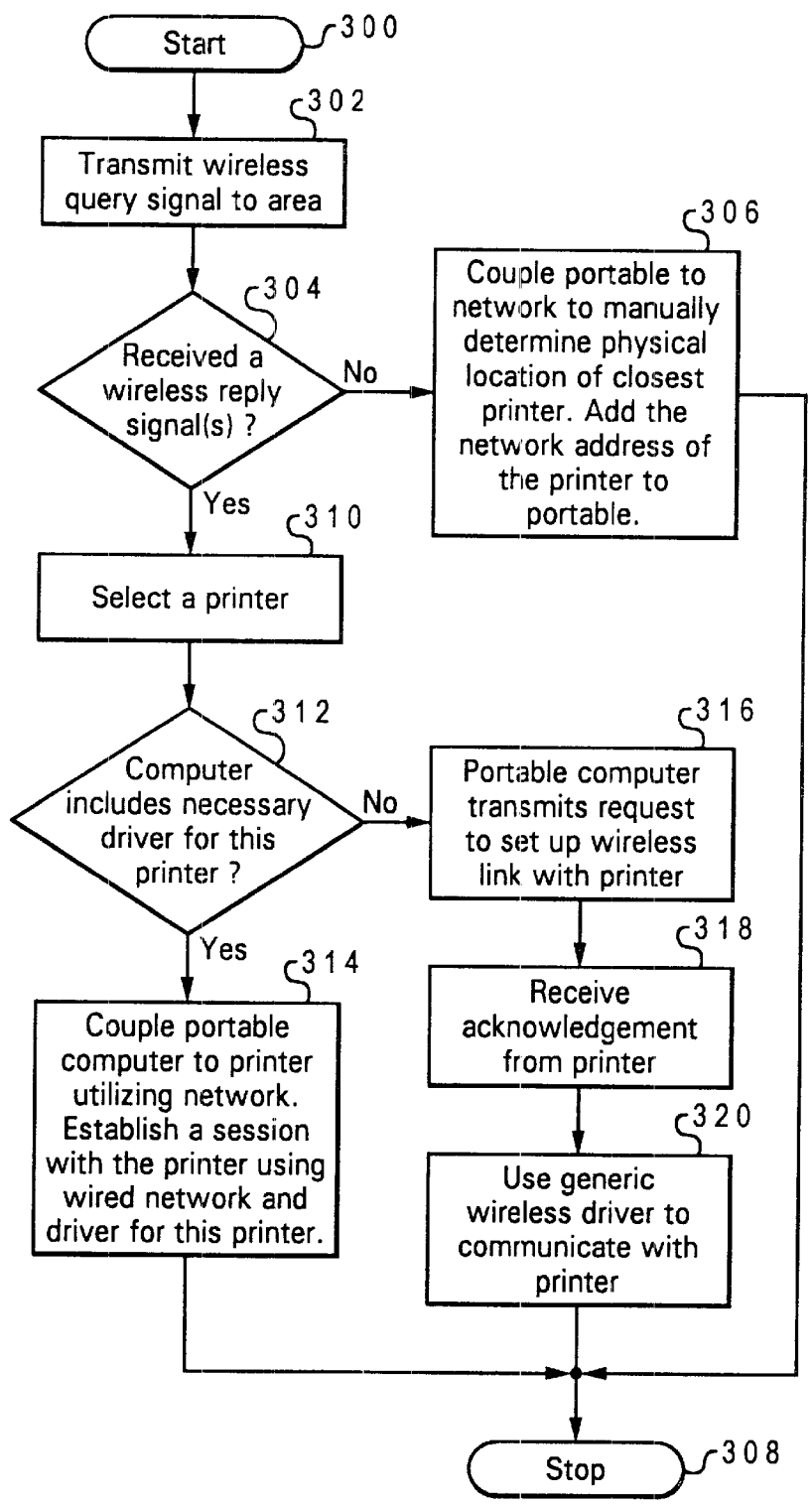
FIG. 3 illustrates a high level flow chart which depicts a computer transmitting a wireless query signal to automatically detect a presence of and establish a communications link with a printer located in a remote area in accordance with the method and system of the present invention.

FIG. 3 illustrates a high level flow chart which depicts a computer transmitting a wireless query signal to automatically detect a presence of and establish a communications link with a printer located in a remote area in accordance with the method and system of the present invention. The process starts as depicted at block 300 and thereafter passes to block 302 which illustrates the transmission of a wireless query signal. The wireless signal will be received within a reception area which is determined by the strength of the wireless signal. Next, block 304 depicts a determination of whether or not the portable computer received a wireless reply signal. If a determination is made that the portable computer has not received a wireless reply signal, the process passes to block 306 which illustrates requiring a user to couple the portable computer to the network to manually determine the physical location of the closest printer. Once the user has determined the closest printer, the user must add the network address of this printer to the portable. The process then terminates as illustrated at block 308.

Referring again to block 304, if a determination is made that the portable computer has received a wireless reply signal, the process passes to block 310. The portable computer may receive a wireless reply signal from several printers. Block 310 depicts a selection of one of the printers which transmitted a wireless reply signal. Next, block 312 illustrates a determination of whether or not the portable computer includes the necessary driver for communicating with the selected printer. If a determination is made that the portable computer does include the necessary driver for the selected printer, the process passes to block 314 which depicts the portable computer being coupled to the network, and then establishing a session with the printer using the network and the necessary driver. Thereafter, the process terminates as illustrated at block 308.

Referring again to block 312, if a determination is made that the portable computer does not include the necessary driver to communicate with the selected printer, the process passes to block 316 which illustrates the portable computer transmitting a request to the printer to set up a wireless link with the printer. Next, block 318 depicts the portable computer receiving an acknowledgement from the printer that the printer is capable of communicating with the portable computer via a wireless link. The process then passes to block 320 which illustrates the portable computer utilizing a generic wireless driver to communicate with the printer. The process then terminates as depicted at block 308.

FIG. 4 depicts a high level flow chart which illustrates a printer receiving and responding to a wireless query signal from a computer in accordance with the method and system of the present invention. The process starts as depicted at block 400 and thereafter passes to block 402 which illustrates the printer receiving a wireless query signal. The process then passes to block 404 which depicts the printer transmitting a wireless reply signal. The wireless reply signal includes the network address, server name, queue name, and physical location associated with this printer. Next, block 406 illustrates a determination of whether or not the printer received a request from the computer to set up a wireless link. If a determination is made that the printer has received a request from a computer to set up a wireless link, the process passes to block 408 which illustrates a determination of whether or not the printer is capable of receiving print data utilizing a wireless link. If a determination is made that the printer is capable of receiving print data, the process passes to block 410 which depicts the printer transmitting an acknowledgement signal to the computer. Next, block 412 illustrates the receipt of print data by the printer from the computer utilizing a wireless communication link. The process then terminates as depicted at block 414.

Referring again to block 408, if a determination is made that the printer is not capable of receiving print data, the process passes to block 416 which illustrates the printer transmitting a negative acknowledgement to the portable computer. The process then terminates as depicted at block 414.

Referring again to block 406, if a determination is made that the printer has not received a request to set up a wireless link with a portable computer, the process passes to block 418 which depicts the printer receiving a request to set up a session with the portable computer utilizing the network. Next, block 420 illustrates the printer and portable computer establishing a session. Thereafter, block 422 depicts the printer receiving print data from the portable computer utilizing the network. The process then terminates as illustrated at block 414.

While a preferred embodiment has been particularly shown and described, it will be understood by those skilled in the art that various changes in form and detail may be made therein without departing from the spirit and scope of the present invention.

What is claimed is:

1. A method in a data processing system for automatically detecting a presence of a printer within a remote area, and responsive to said detection, automatically establishing a communications link with said printer, said method comprising the steps of:
   a computer included within said system transmitting a wireless query signal to said remote area;
   in response to a printer physically located within said remote area receiving said wireless query signal, said printer transmitting a wireless reply signal to said remote area;
   in response to said computer receiving said wireless reply signal, said computer automatically establishing a communications link with said printer, wherein said computer utilizes said printer to print information;

establishing a wireless interface within said printer for transmitting and receiving wireless signals;

establishing a wireless interface within said computer for transmitting and receiving wireless signals;

in response to said computer receiving said wireless reply signal, said computer determining whether said computer is capable of communication with said printer utilizing a wired network;

in response to a determination that a computer is capable of communication with said printer utilizing said wired network, coupling said computer to said printer utilizing said wired network; and said computer automatically configuring itself to communicate with said printer utilizing said wired network.

2. The method according to claim 1, further comprising the steps of:

in response to a determination that computer is not capable of communicating with said printer utilizing said wired network, said computer remaining disconnected from said printer; and said computer automatically configuring itself to communicate with said printer utilizing a wireless communications link.

3. The method according to claim 2, further comprising the step of said computer automatically configuring itself to communicate with said printer without a user of said computer being aware of a network address of said printer.

4. The method according to claim 3, further comprising the step of said printer transmitting said reply signal including an identification of a printer type of said printer.

5. The method according to claim 4, further comprising the step of said printer transmitting said reply signal including an identification of a physical location and said network address of said printer.

6. The method according to claim 5, further comprising the steps of:

said computer determining whether said computer includes a software driver for communicating with said printer type;

in response to a determination that said computer does include said driver, coupling said computer to said printer utilizing said wired network; and said computer utilizing said driver to communicate with said printer utilizing said wired network.

7. The method according to claim 6, further comprising the steps of:

in response to a determination that said computer does not include said driver, said computer remaining disconnected from said printer; and said computer utilizing a generic, wireless driver to communicate with said printer utilizing wireless signals.

8. A data processing system for automatically detecting a presence of a printer within a remote area, and responsive to said detection, automatically establishing a communications link with said printer, said computer being physically disconnected from said printer, comprising:

a computer included within said system capable of transmitting a wireless query signal to said remote area;

in response to a printer physically located within said remote area receiving said wireless query signal, said printer capable of transmitting a wireless reply signal to said remote area;

in response to said computer receiving said wireless reply signal, said computer capable of automatically establishing a communications link with said printer, wherein said computer utilizes said printer to print information;

a wireless interface included within said printer for transmitting and receiving wireless signals;

a wireless interface included within said computer for transmitting and receiving wireless signals;

in response to said computer receiving said wireless reply signal, said computer executing code for determining whether said computer is capable of communicating with said printer utilizing a wired network;

in response to a determination that computer is capable of communicating with said printer utilizing said wired network, said computer capable of being coupled to said printer utilizing said wired network; and said computer executing code for automatically configuring itself to communicate with said printer utilizing said wired network.

9. The system according to claim 8, further comprising:

in response to a determination that computer is not capable of communicating with said printer utilizing said wired network, said computer capable of remaining disconnected from said printer; and said computer executing code for automatically configuring itself to communicate with said printer utilizing a wireless communications link.

10. The system according to claim 9, further comprising said computer executing code for automatically configuring itself to communicate with said printer without a user of said computer being aware of a network address of said printer.

11. The system according to claim 10, further comprising said printer capable of transmitting said reply signal including an identification of a printer type of said printer.

12. The system according to claim 11, further comprising said printer capable of transmitting said reply signal including an identification of a physical location and said network address of said printer.

13. The system according to claim 12, further comprising:

said computer executing code for determining whether said computer includes a software driver for communicating with said printer type;

in response to a determination that said computer does include said driver, said computer capable of being coupled to said printer utilizing a wired network; and said computer executing code for utilizing said driver to communicate with said printer utilizing said wired network.

14. The system according to claim 13, further comprising:

in response to a determination that said computer does not include said driver, said computer capable of remaining disconnected from said printer; and said computer executing code for utilizing a generic, wireless driver to communicate with said printer utilizing wireless signals.

15. A data processing system for automatically detecting a presence of a printer within a remote area, and responsive to said detection, automatically establishing a communications link with said printer, said computer being physically disconnected from said printer, comprising:

said computer including a wireless interface for transmitting and receiving wireless signals;

said printer including a wireless interface for transmitting and receiving wireless signals;

a computer included within said system capable of transmitting a wireless query signal to said remote area;

in response to a printer physically located within said remote area receiving said wireless query signal, said printer capable of transmitting a wireless reply signal to said remote area, said reply signal including an identification of a printer type of said printer, an identification of a physical location, and a network address of said printer;

in response to said computer receiving said wireless reply signal, said computer executing code for determining whether said computer is capable of communicating with said printer utilizing a wired network by determining whether said computer includes a software driver for communicating with a type of printer including said printer;

in response to a determination that said computer does include said driver, said computer capable of being coupled to said printer utilizing a wired network and said computer executing code for utilizing said driver to communicate with said printer utilizing said wired network, said computer executing code for automatically configuring itself to communicate with said printer without a user of said computer being aware of said network address of said printer; and in response to a determination that said computer does not include said driver, said computer capable of remaining disconnected from said printer and said computer executing code for utilizing a generic, wireless driver to communicate with said printer utilizing wireless signals.

* * * * *